June 12, 1928. 1,673,677
W. E. HOLLAND
ELECTRIC BATTERY COVER AND SEALING MEANS
Filed May 10, 1921
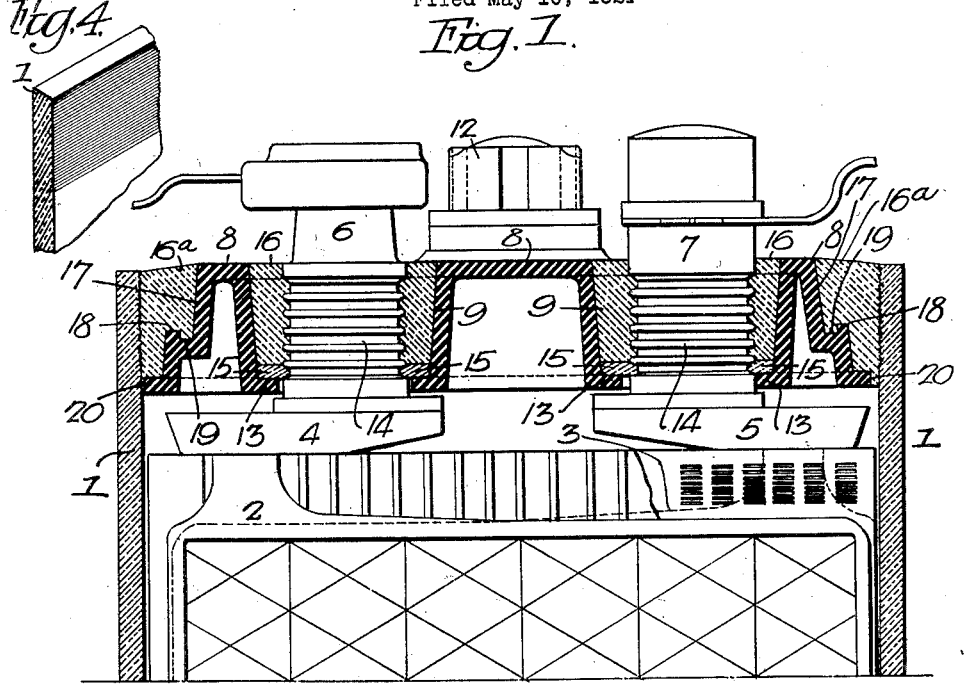
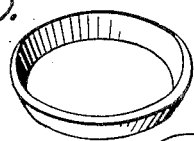
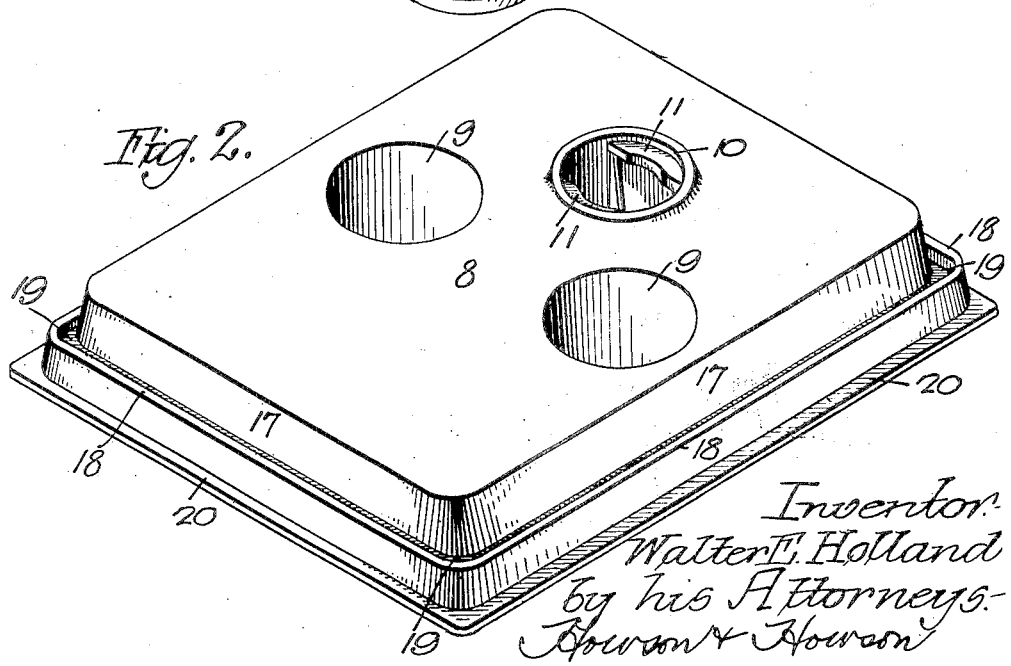
Inventor.
Walter E. Holland
by his Attorneys
Howson & Howson Patented June 12, 1928.

1,673,677

UNITED STATES PATENT OFFICE.

WALTER E. HOLLAND, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA.

ELECTRIC BATTERY COVER AND SEALING MEANS.

Application filed May 10, 1921. Serial No. 468,315.

My invention relates to certain improvements in the sealing of, and in the covers or closures for, battery cells. These covers are usually made of hard rubber and sealing material is placed between the side walls of the containing jar and the cover. Sealing material is also placed around the terminal posts, and between each post and the adjacent portion of the cover.

The objects of my invention are to improve the construction of a cover of this type so as to form a more effective joint between it and the sealing compound; to provide a simple and effective means for securely locking the cover to the terminal posts as well as to provide means whereby the sealing compound will adhere to the jar wall more strongly.

In the accompanying drawings:

Fig. 1 is a sectional view of the upper portion of a battery cell illustrating my invention;

Fig. 2 is a perspective view of one form of the cover;

Fig. 3 is a perspective view of one of the fastening washers; and

Fig. 4 is a sectional perspective view showing grooves in the inner surface of the jar wall.

In the above drawings, 1 is a battery cell jar and 2 and 3 are the positive and negative plates, which are connected in groups by straps 4 and 5 respectively. 6 is a terminal post extending from the strap 4, and 7 is a terminal post extending from the strap 5, while 8 is a cover, preferably molded in one piece of hard rubber. This cover fits freely in the open top of the jar 1 above the straps and has three openings 9, 9 and 10, in the present instance, as shown in Fig. 2. The terminal posts 6 and 7 extend through the openings 9. The opening 10 is provided with internal flanges 11, which are engaged by projections on a vent cap 12 having a suitable vent opening therein.

At the bottom of the openings 9 are flanges 13, which may rest on the shoulders at the base of the terminal posts 6 and 7. In the present instance, a series of annular ribs 14 are formed on each terminal post 6 and 7, so as to lie in the cover openings 9, which are much larger than said posts. Said openings are slightly tapered and in the bottom of each of them is a washer 15 made of suitable acid-resisting material. I prefer to make this of lead or a lead alloy in the form of a conical ring (Figure 3) which, when placed in the depression around the post and acted on by a suitable tool, will assume the form shown at 15, contracting at the same time on or below one of the ribs on the post to lock the cover securely to the same. If preferred, this locking washer may also be cast in place, for which purpose it is made of suitable molten or plastic material. The adherent sealing compound 16 is then poured into the openings around the posts to make a tight seal, thus preventing the cover from rising and also forming a water-tight joint at the terminal posts.

The cover has a deep flange 17 at each edge and this flange is made in step form as shown at 18. In the preferred form of the invention a groove 19 is formed in the step, and this groove is continuous, passing around all four sides of the cover. At the lower edge of the flange is a lateral extension 20. The cover fits freely in the top of the jar 1 and the sealing compound $16^a$ is placed in the space between the jar wall and the flange of the cover, as shown in Fig. 1. This sealing compound is poured in while in a molten condition and as the space between the lower portion of the flange and the jar is relatively narrow, the compound at this point is quickly chilled by the jar and cover walls, which prevents the sealing material passing through any clearance space between the cover and the jar. The sealing material, as it cools and shrinks, grips and interlocks with the cover, due to the stepped and recessed formation of the flange, so that there is but little likelihood of the cover pulling away from the sealing material owing to settling or vibratory movement of the plate element. Furthermore, the stepped or ribbed construction makes a circuitous path, which serves to prevent the ready escape of the liquid should the joint between the sealing compound and the cover become partly open. The inner surface of the jar wall adjacent the cover may be grooved or roughened as in Fig. 4, so that the sealing material will adhere more firmly to the jar than if the surface were left smooth.

It is to be understood that the form of this invention herein shown and described is to be taken as a preferred example of the same, and that various changes in the shape, size and arrangement of parts may be resorted to without departing from the spirit of the invention or scope of the subjoined claims.

I claim:

1. A battery cover having a body portion with filling and terminal post openings therein, and having a peripheral flange whose outer face is formed with an upwardly opening recess surrounded by an upwardly projecting rib, said body portion having also a lateral flange at a level below the said rib adapted to come in close proximity to the jar walls and retain the sealing compound.

2. A battery cover consisting of a body portion having a depending peripheral flange stepped substantially midway of its depth; a groove extending along the flange at the step; and a laterally extending portion at the bottom which, when the cover is placed in position, will come in close proximity to the jar walls and retain sealing compound.

3. The combination of a container; a cover having a body provided with a ribbed peripheral flange having a continuous upwardly opening recess therein; with sealing compound between the walls of the container and the ribbed and recessed portion of the cover flange.

WALTER E. HOLLAND.